(12) United States Patent  
Horng et al.

(10) Patent No.: US 6,930,867 B2  
(45) Date of Patent: Aug. 16, 2005

(54) THERMALLY SUPPRESSING CIRCUIT FOR RESTARTING A LOCKED MOTOR

(75) Inventors: Alex Horng, Kaohsiung (TW); Yin-Rong Hong, Kaohsiung (TW); Ta-Lun Ko, Fengshan (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 213 days.

(21) Appl. No.: 10/259,523

(22) Filed: Sep. 30, 2002

(65) Prior Publication Data

US 2004/0070892 A1 Apr. 15, 2004

(51) Int. Cl.[7] ............................................... H02H 5/04
(52) U.S. Cl. ................................. 361/25; 361/103
(58) Field of Search ........................... 361/20, 21, 22, 361/23, 24, 25, 101, 103; 318/434, 459, 254

(56) References Cited

U.S. PATENT DOCUMENTS

| | | | | |
|---|---|---|---|---|
| 4,578,623 A | * | 3/1986 | Tsukutani et al. | ........... 318/254 |
| 4,856,078 A | * | 8/1989 | Konopka | ..................... 388/831 |
| 5,317,244 A | * | 5/1994 | Ishikura | ....................... 318/254 |
| 5,363,024 A | * | 11/1994 | Hiratsuka et al. | ........... 318/254 |
| 5,554,913 A | * | 9/1996 | Ohsawa | ...................... 318/434 |
| 5,682,088 A | * | 10/1997 | Sonnek | ....................... 318/254 |
| 6,060,848 A | * | 5/2000 | Alvaro et al. | ................ 318/254 |
| 6,731,086 B2 | * | 5/2004 | Nonaka | ...................... 318/459 |
| 6,788,017 B2 | * | 9/2004 | Lin et al. | ..................... 318/487 |

* cited by examiner

Primary Examiner—Brian Sircus
Assistant Examiner—Danny Nguyen
(74) Attorney, Agent, or Firm—Bacon & Thomas, PLLC

(57) ABSTRACT

A thermally suppressing circuit includes a restart-charging drive member, a coil set, a restart-charging capacitor, and a charging switch set. The restart-charging drive member is electrically connected to the coil set and the restart-charging capacitor while the charging switch set is connected between the coil set and the restart-charging capacitor. The charging switch set is used to access signals output from the restart-charging drive member. In abnormal operation, as the restart-charging drive member may turn on an auto-restart function to output a high or low voltage signal, the charging switch set is turned on to accelerate charging the restart-charging capacitor to thereby avoid overcurrent passing the coil set.

6 Claims, 5 Drawing Sheets

THERMALLY SUPPRESSING CIRCUIT FOR RESTARTING A LOCKED MOTOR

BACKGROUND OF THE INVENTION

1. Field of the Invention

The present invention relates to a thermally suppressing circuit, and more particularly to a thermally suppressing circuit for restarting a locked motor, which comprises an auto-restart function of a restart-charging drive IC, adapted to reduce an auto restart time interval for a coil by means of detecting an auto restart signal to thereby avoid destroying the motor during low motor speed, locking fan wheel, or passing overcurrent.

2. Description of the Related Art

In long-term use, a conventional fan has two abnormal situations. The first situation is accumulating a huge mass of dust which results in a decrease in motor speed. The second situation is inserting an external thing into the fan blades or the internal space of the motor which results in locking the motor. Under these two abnormal situations, the current passing the motor coil becomes tremendous and increases rapidly. The great power consumption, caused by the large current on the motor coil, may be changed to heat that results in a great increase in the temperature. Also, the increasing temperature at the motor coil may further aggravate the power consumption so that the temperature at the motor coil is increased repeatedly. Subsequently, the high temperature may deteriorate sharply the quality of the insulator of the enamel-insulated wire, which may be cracked. Consequently, the cracked insulator of the motor coil results in a short circuit that the motor may be destroyed.

During the abnormal situation the conventional motor is designed to prevent an overcurrent from passing through the motor coil, generally an auto restart function is built in a drive IC. In this manner the restart-charging drive IC restarts the motor repeatedly at each time interval during the abnormal situation. If the motor is broken down or fails to restart, the power is initially cut off and the motor is then restarted at each time interval.

FIG. 1 illustrates a circuitry of a conventional double phase brushless dc motor circuit. Referring to FIG. 1, a motor drive circuit 1 comprises a restart-charging drive IC 10, two coils 11, two transistors 12, and a restart-charging capacitor 13. The restart-charging drive IC 10 is adapted to turn on or off the transistors 12 to thereby control the coils 11. The auto restart function of the motor drive circuit 1 predetermines time intervals of ON and OFF whose ratio is adapted to control that of the charging time to the discharging time of the restart-charging capacitor 13. In responding to the ON and OFF time intervals, the motor drive circuit 1 may turn on or off the transistors 12.

FIG. 2 illustrates a circuitry of a conventional single-phase brushless dc motor circuit. Referring to FIG. 2, a motor drive circuit 2 comprises a restart-charging drive IC 20, a coil 21, and a restart-charging capacitor 22. In responding to the ON and OFF time intervals, the motor drive circuit 2 is adapted to electrically open or close the coil 21.

FIG. 3 illustrates a circuitry of a conventional double phase brushless dc motor circuit. Referring to FIG. 3, a motor drive circuit 3 comprises a restart-charging drive IC 30, two coils 31, and a restart-charging capacitor 32. In responding to the ON and OFF time intervals, the motor drive circuit 3 is adapted to electrically open or close the coils 31.

FIGS. 4A and 4B illustrate waveform diagrams of a restart-charging drive member and a restart-charging capacitor of a brushless dc motor. Referring to FIG. 4A, during a locked situation, the restart-charging drive IC outputs a high voltage signal (Hi) within a time interval T1 as the restart-charging capacitor C is charged. Alternatively, it outputs a low voltage signal (Lo) within a time interval T2 as the restart-charging capacitor C is discharged in turn. Referring to FIG. 4B, during a locked situation, the restart-charging drive IC outputs a low voltage signal (Lo) within a time interval T1 as the restart-charging capacitor C is charged. Alternatively, it outputs a high voltage signal (Hi) within a time interval T2 as the restart-charging capacitor C is discharged in turn.

Referring again to FIGS. 4A and 4B, the ratio of T1 to T2 is fixed and constant due to the unchangeable ratio of a charging time to a discharging time of the restart-charging capacitor C.

Referring again to FIGS. 1 through 4A and 4B, the motor is automatically restarted by a current with maximum power consumption within a time interval T1 when the restart-charging capacitors 13, 22, 32 are charged. The motor is repeatedly restarted at each time interval T1 as long as the locked situation is continued. As to the low speed or low power motor, the maximum power consumption of the motor may not result in greater power consumption and a vast amount of heat. As to the high speed or high power motor, a rapid overcurrent, exceeding several amperes, may pass the coil resulting in greater power consumption and a vast amount of heat when the motor is in abnormal operation. Consequently, the motor may be destroyed due to the vast amount of heat.

The present invention intends to provide a thermally suppressing circuit adapted to reduce a charging time interval of a restart-charging capacitor by means of detecting an auto-restart signal for avoiding destruction of the motor in such a way to mitigate and overcome the above problem.

SUMMARY OF THE INVENTION

The primary objective of this invention is to provide a thermally suppressing circuit adapted to reduce a charging time interval of a restart-charging capacitor by means of detecting an auto-restart signal to thereby reduce a time interval of turning on a coil so that the motor may avoid being destroyed.

The secondary objective of this invention is to provide the thermally suppressing circuit, suitable to an auto-restart function of a restart-charging drive IC, adapted to reduce a charging time of a restart-charging capacitor by means of detecting an auto-restart signal from the restart-charging drive IC so that the design of the drive circuitry is improved.

The present invention is a thermally suppressing circuit for restarting a locked motor. The thermally suppressing circuit mainly comprises a restart-charging drive member, a coil set, a restart-charging capacitor, and a charging switch set. The restart-charging drive member is electrically connected to the coil set and the restart-charging capacitor while the charging switch set connected between the coil set and the restart-charging capacitor. The charging switch set is used to access signals output from the restart-charging drive member. In abnormal operation, as the restart-charging drive member may turn on an auto-restart function to output a high or low voltage signal, the charging switch set is turned on to accelerate charging the restart-charging capacitor to thereby avoid overcurrent passing the coil set.

Another aspect of the present invention is the charging switch set comprised of a pair of diodes or a transistor and a pair of capacitors.

Another aspect of the present invention is a resistor in series connection between the charging switch set and the restart-charging capacitor. The resistance value is adapted to adjust the acceleration rate of the restart-charging capacitor.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 5:
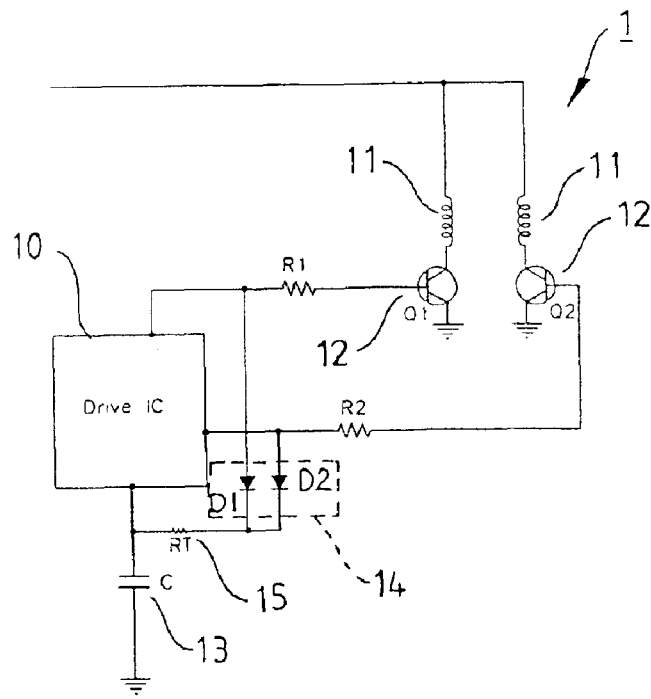
FIG. 5 is a circuitry of a thermally suppressing circuit for a double phase brushless dc motor circuit in accordance with a first embodiment of the present invention.

Referring to FIG. 5 through, reference numerals of first through fourth embodiments have applied the identical numerals of the first conventional elements. The restart-charging drive member and the restart-charging capacity of these embodiments have the similar configuration and same function as the conventional elements.

Construction of the thermally suppressing circuit shall be described in detail, referring now to FIG. 5. The motor drive circuit 1 having a thermally suppressing circuit in accordance with a first embodiment of the present invention includes a restart-charging drive member 10, a coil set (double coil) 11, two transistors 12, a restart-charging capacitor 13, and a charging switch set 14. The charging switch set 14 is comprised of a pair of diodes D1 and D2. The restart-charging drive member 10 is electrically connected to the coil set 11 and the restart-charging capacitor 13 while the charging switch set 14 connected between the coil set 11 and the restart-charging capacitor 13. The charging switch set 14 is used to access signals output from the restart-charging drive member 10. In normal operation, the restart-charging drive member 10 is adapted to control the coil set 11 by means of turning on or off. In abnormal operation, as the restart-charging drive member 10 may turn on an auto-restart function to output a high or low voltage signal, the charging switch set 14 is turned on to accelerate charging the restart-charging capacitor 13 to thereby avoid overcurrent passing the coil set 11. Consequently, the total charging time of the restart-charging capacitor 13 is reduced to avoid destroying the coil set 11. Meanwhile, a resistor 15 is connected in series between the restart-charging capacitor 13 and the charging switch set 14. The resistance value is adapted to adjust the acceleration rate of the restart-charging capacitor 13.

Figure 1:
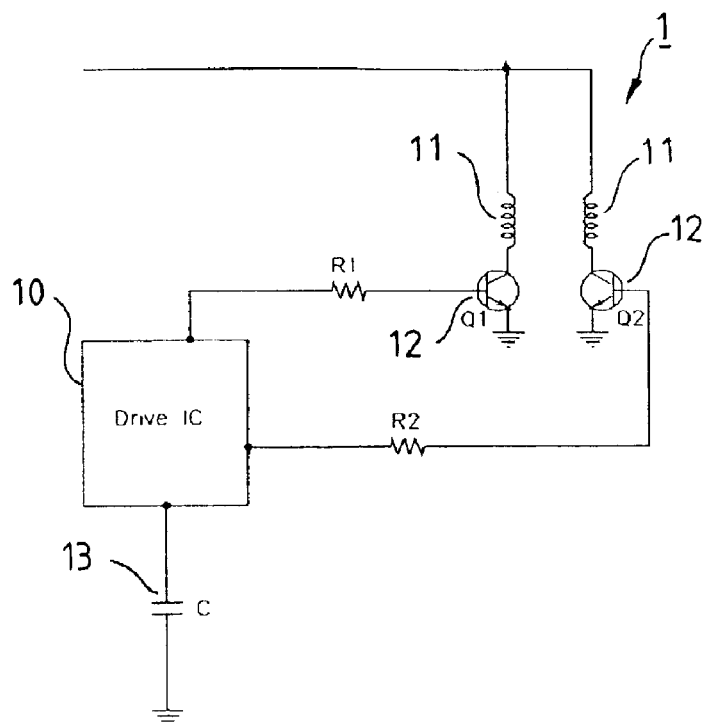
FIG. 1 is a circuitry of a conventional double phase brushless dc motor circuit in accordance with the prior art.
Figure 2:
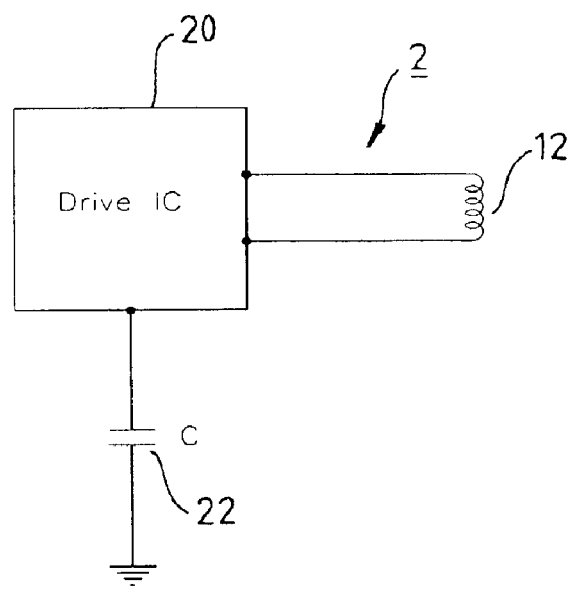
FIG. 2 is a circuitry of a conventional single-phase brushless dc motor circuit in accordance with the prior art.
Figure 3:
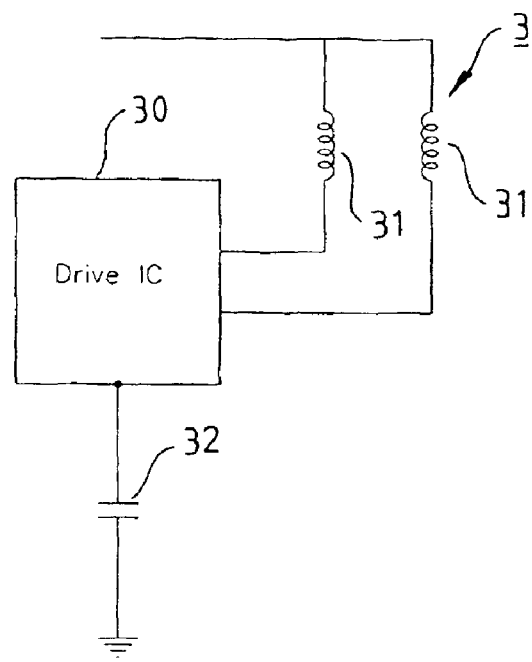
FIG. 3 is a circuitry of a conventional double phase brushless dc motor circuit in accordance with the prior art.
Figure 4A:
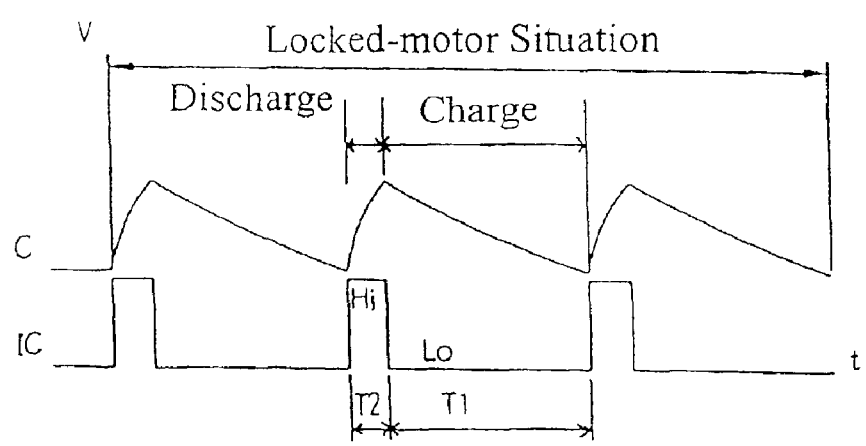
FIG. 4A is a waveform diagram of a restart-charging drive member and a restart-charging capacitor of a brushless dc motor in accordance with the prior art.

Referring to FIGS. 4A and 5, as the restart-charging drive member 10 turns on its auto-restart function to output a high voltage signal (Hi) within a time interval T1 and then the restart-charging capacitor 13 is charged. In this manner, the diode D1 or D2 of the charging switch set 14 is alternatively turned on to allow passage of a current from the coil set 11 to thereby reduce the time interval T1. Subsequently, once the restart-charging drive member 10 outputs a low voltage signal (Lo) within a time interval T2, the charging operation of the charging capacitor 13 is terminated. Then, the charging switch set 14 is turned off and the restart-charging capacitor 13 is actuated to discharge to the ground.

Referring again to FIGS. 4A and 5, the restart-charging drive member 10 repeatedly restarts the motor at each time interval T1 until the abnormal operation is eliminated. Since the charging time of the time interval T1 is shortened in abnormal operation, the motor can avoid passing an overcurrent which is capable destroying it. In design the adjustment of the time interval T1 is chosen depending upon motor's features.

Figure 6:
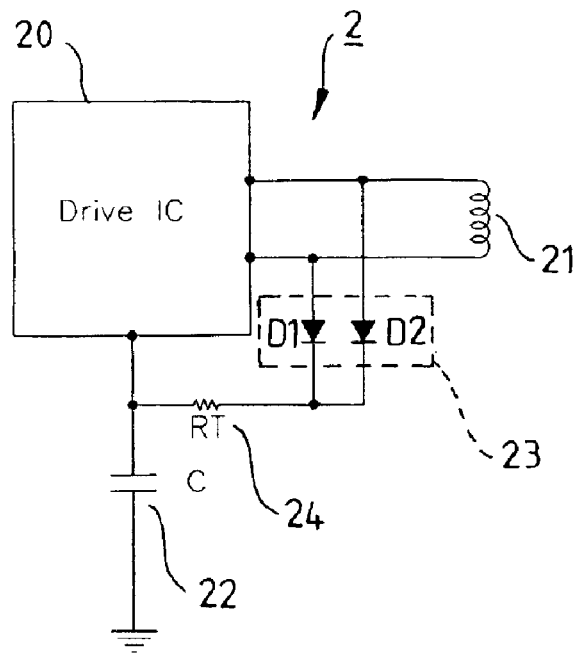
FIG. 6 is a circuitry of a thermally suppressing circuit for a single-phase brushless dc motor circuit in accordance with a second embodiment of the present invention.

Referring to FIG. 6, the motor drive circuit 2 having a thermally suppressing circuit in accordance with a second embodiment of the present invention includes a restart-charging drive member 20, a coil set (single coil) 21, a restart-charging capacitor 22, and a charging switch set 23. The charging switch set 23 is comprised of a pair of diodes D1 and D2. The restart-charging drive member 20 is electrically connected to the coil set 21 and the restart-charging capacitor 22 while the charging switch set 23 connected between the coil set 21 and the restart-charging capacitor 22. The charging switch set 23 is used to access signals output from the restart-charging drive member 20. In normal operation, the restart-charging drive member 20 is adapted to control the coil set 21 by means of turning on or off. In abnormal operation, as the restart-charging drive member 20 may turn on an auto-restart function to output a high or low voltage signal, the charging switch set 23 is turned on to accelerate charging the restart-charging capacitor 22 to thereby avoid overcurrent passing the coil set 21. Consequently, the total charging time of the restart-charging capacitor 22 is reduced to avoid destroying the coil set 21. Meanwhile, a resistor 24 is connected in series between the restart-charging capacitor 22 and the charging switch set 23. The resistance value is adapted to adjust the acceleration rate of the restart-charging capacitor 22.

Referring to FIGS. 4A and 6, as the restart-charging drive member 20 turns on its auto-restart function to output a high voltage signal (Hi) within a time interval T1, the restart-charging capacitor 22 is charged. In this manner, the diode D1 or D2 of the charging switch set 23 is alternatively turned on to allow passage of a current from the coil set 21 to thereby reduce the time interval T1. Subsequently, once the restart-charging drive member 20 outputs a low voltage signal (Lo) within a time interval T2, the charging operation of the charging capacitor 22 is terminated. Then, the charging switch set 23 is turned off and the restart-charging capacitor 22 is actuated to discharge to the ground.

Figure 7:
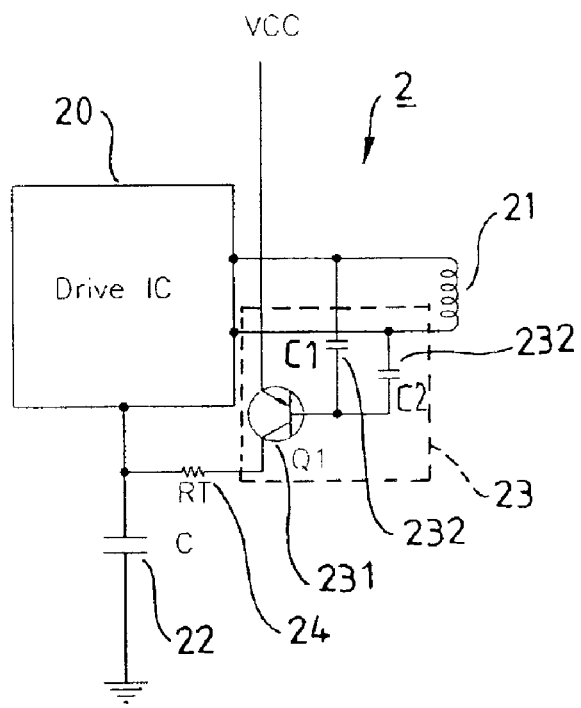
FIG. 7 is a circuitry of a thermally suppressing circuit for a double phase brushless dc motor circuit in accordance with a third embodiment of the present invention.

Referring to FIG. 7, the motor drive circuit 2 having a thermally suppressing circuit in accordance with a third embodiment of the present invention includes a restart-charging drive member 20, a coil set (single coil) 21, a restart-charging capacitor 22, and a charging switch set 23. The charging switch set 23 is comprised of a transistor 231 and a pair of capacitors 232. The restart-charging drive member 20 is electrically connected to the coil set 21 and the restart-charging capacitor 22 while the charging switch set 23 connected between the coil set 21 and the restart-charging capacitor 22. The charging switch set 23 is used to access signals output from the restart-charging drive member 20. In normal operation, the restart-charging drive member 20 is adapted to control the coil set 21 by means of turning on or off. In abnormal operation, as the restart-charging drive member 20 may turn on an auto-restart function to output a high or low voltage signal, the charging switch set 23 is turned on to accelerate charging the restart-charging capacitor 22 to thereby avoid overcurrent passing the coil set 21. Consequently, the total charging time of the restart-charging capacitor 22 is reduced to avoid destroying the coil set 21. Meanwhile, a resistor 24 is connected in series between the restart-charging capacitor 22 and the charging switch set 23. The resistance value is adapted to adjust the acceleration rate of the restart-charging capacitor 22.

Figure 4B:
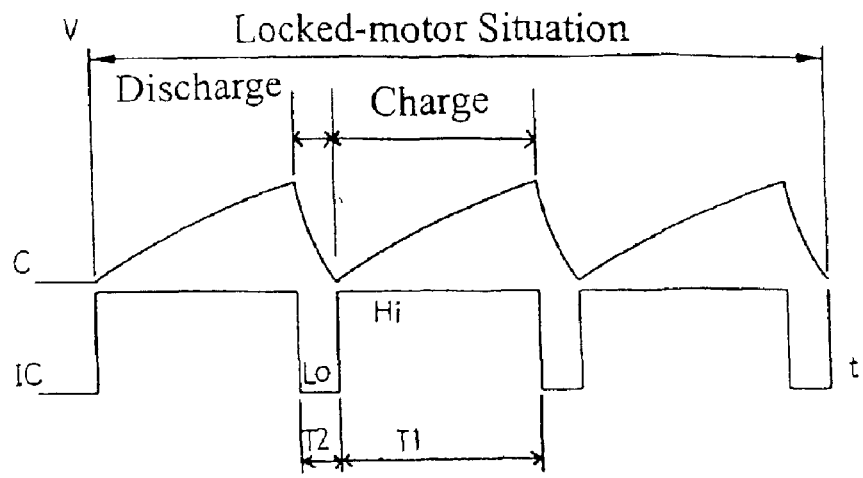
FIG. 4B is a waveform diagram of a restart-charging drive member and a restart-charging capacitor of a brushless dc motor in accordance with the prior art.

Referring to FIGS. 4B and 7, as the restart-charging drive member 20 turns on its auto-restart function to output a low voltage signal (Lo) within a time interval T1, the restart-charging capacitor 22 is charged. In this manner, the base of the transistor 231 of the charging switch set 23 alternatively turns on the capacitor C1 or C2 to allow passage of a current from the coil set 21 to thereby reduce the time interval T1. Subsequently, once the restart-charging drive member 20 outputs a high voltage signal (Hi) within a time interval T2, the charging operation of the charging capacitor 22 is terminated. Then, the charging switch set 23 is turned off and the restart-charging capacitor 22 is actuated to discharge to the ground.

Figure 8:
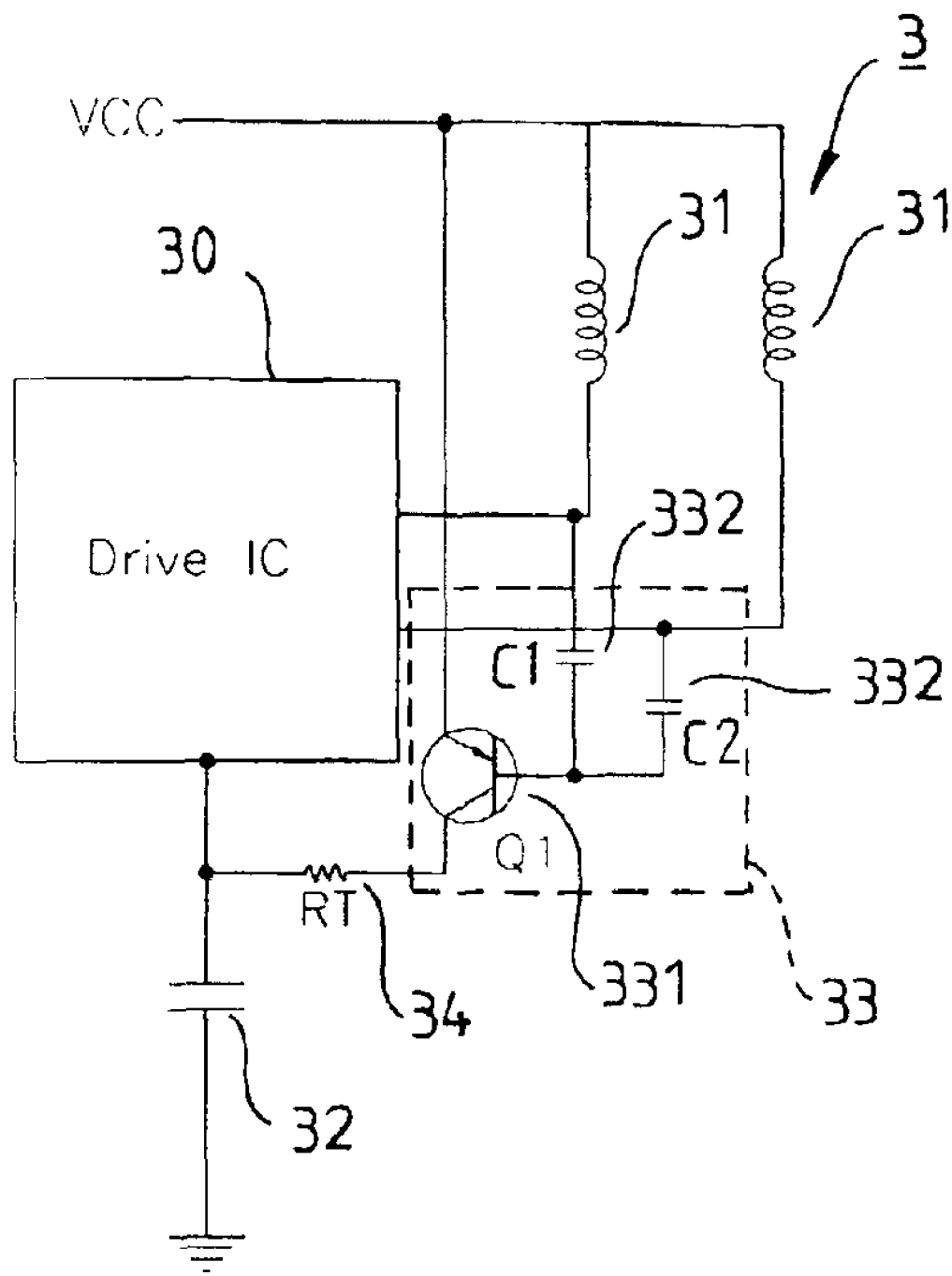
FIG. 8 is a circuitry of a thermally suppressing circuit for a single-phase brushless dc motor circuit in accordance with a fourth embodiment of the present invention.

Referring to FIG. 8, the motor drive circuit 3 having a thermally suppressing circuit in accordance with a fourth embodiment of the present invention includes a restart-charging drive member 30, a coil set (double coil) 31, a restart-charging capacitor 32, and a charging switch set 33. The charging switch set 33 is comprised of a transistor 331 and a pair of capacitors 332. The restart-charging drive member 30 is electrically connected to the coil set 31 and the restart-charging capacitor 32 while the charging switch set 33 connected between the coil set 31 and the restart-charging capacitor 32. The charging switch set 33 is used to access signals output from the restart-charging drive member 30. In normal operation, the restart-charging drive member 30 is adapted to control the coil set 31 by means of turning on or off. In abnormal operation, as the restart-charging drive member 30 may turn on an auto-restart function to output a high or low voltage signal, the charging switch set 33 is turned on to accelerate charging the restart-charging capacitor 32 to thereby avoid overcurrent passing the coil set 31. Consequently, the total charging time of the restart-charging capacitor 32 is reduced to avoid destroying the coil set 21. Meanwhile, a resistor 34 is connected in series between the restart-charging capacitor 32 and the charging switch set 33. The resistance value is adapted to adjust the acceleration rate of the restart-charging capacitor 32.

Referring to FIGS. 4B and 8, as the restart-charging drive member 30 turns on its auto-restart function to output a low voltage signal (Lo) within a time interval T1, the restart-charging capacitor 32 is charged. In this manner, the base of the transistor 331 of the charging switch set 23 alternatively turns on the capacitor C1 or C2 to allow passage of a current from the coil set 31 to thereby reduce the time interval T1. Subsequently, once the restart-charging drive member 30 outputs a high voltage signal (Hi) within a time interval T2, the charging operation of the charging capacitor 32 is terminated. Then, the charging switch set 33 is turned off and the restart-charging capacitor 32 is actuated to discharge to the ground.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A thermally suppressing circuit, comprising:

a restart-charging drive member having an auto-restart function which is turned on during abnormal operation;

a coil set connected to the restart-charging drive member, which controls the coil set by turning the coil set on or off;

a charging switch set connected to the coil set and adapted to access signals output from the restart-charging drive member, said charging switch set comprising a transistor and a pair of capacitors; and a restart-charging capacitor connected to the restart-charging drive member and to the charging switch set and arranged to be charged while the auto-restart function is turned on;

wherein when the restart-charging drive member turns on the auto-restart function, the charging switch set is turned on to accelerate charging of the restart-charging capacitor.

2. The thermally suppressing circuit as defined in claim 1, further comprising a resistor connected in series between the restart-charging capacitor and the charging switch set, wherein the resistor is adapted to adjust an acceleration rate of the restart-charging capacitor.

3. The thermally suppressing circuit as defined in claim 1, wherein the restart-charging drive member turns on the auto-restart function to output a high voltage signal during abnormal operation, so that the charging switch set is turned on to accelerate charging the restart-charging capacitor.

4. The thermally suppressing circuit as defined in claim 1, wherein the restart-charging drive member turns on the auto-restart function to output a low voltage signal during abnormal operation, so that the charging switch set is turned on to accelerate charging the restart-charging capacitor.

5. The thermally suppressing circuit as defined in claim 1, wherein the coil set is a double coil.

6. The thermally suppressing circuit as defined in claim 1, wherein the coil set is a single coil.

* * * * *